United States Patent
Ohmori et al.

(10) Patent No.: US 10,916,792 B2
(45) Date of Patent: Feb. 9, 2021

(54) FUEL CELL STACK

(71) Applicant: HONDA MOTOR CO., LTD., Tokyo (JP)

(72) Inventors: Suguru Ohmori, Wako (JP); Kosuke Takagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 200 days.

(21) Appl. No.: 16/005,731

(22) Filed: Jun. 12, 2018

(65) Prior Publication Data

US 2018/0366761 A1 Dec. 20, 2018

(30) Foreign Application Priority Data

Jun. 15, 2017 (JP) ................. 2017-117717

(51) Int. Cl.
| | |
|---|---|
| *H01M 8/2475* | (2016.01) |
| *H01M 8/241* | (2016.01) |
| *H01M 8/248* | (2016.01) |
| *H01M 8/0247* | (2016.01) |
| H01M 8/1018 | (2016.01) |

(52) U.S. Cl.
CPC ....... *H01M 8/2475* (2013.01); *H01M 8/0247* (2013.01); *H01M 8/241* (2013.01); *H01M 8/248* (2013.01); H01M 2008/1095 (2013.01); H01M 2250/20 (2013.01)

(58) Field of Classification Search
CPC ..... H01M 2008/1095; H01M 2250/20; H01M 8/0247; H01M 8/241; H01M 8/2475; H01M 8/248
See application file for complete search history.

(56) References Cited

U.S. PATENT DOCUMENTS

| | | | | |
|---|---|---|---|---|
| 2008/0305368 A1* | 12/2008 | Takahashi | ........... | H01M 8/0297 429/437 |
| 2014/0106254 A1 | 4/2014 | Yamano et al. | | |
| 2016/0072145 A1* | 3/2016 | Martinchek | ......... | H01M 8/2404 429/457 |
| 2016/0226092 A1 | 8/2016 | Nishiyama et al. | | |

FOREIGN PATENT DOCUMENTS

| | | |
|---|---|---|
| JP | 2014-096358 | 5/2014 |
| JP | 2014-175169 | 9/2014 |
| JP | 2016-143545 | 8/2016 |

OTHER PUBLICATIONS

Japanese Office Action for Japanese Patent Application No. 2017-117717 dated Feb. 5, 2019.

* cited by examiner

*Primary Examiner* — Victoria H Lynch
(74) *Attorney, Agent, or Firm* — Amin, Turocy & Watson, LLP

(57) ABSTRACT

A fuel cell stack includes a load receiver provided in a first separator, and a contact portion. The load receiver includes a protrusion protruding outward from an outer peripheral portion of the first separator. The protrusion includes a protrusion body positioned at the center in a width direction of the protrusion, and a pair of expansions expanded in the width direction from both ends of the protrusion body in the width direction. When the load receiver contacts the contact portion, only a top portion of the expansion contacts the contact portion.

7 Claims, 7 Drawing Sheets

FUEL CELL STACK

CROSS-REFERENCE TO RELATED APPLICATION

This application is based upon and claims the benefit of priority from Japanese Patent Application No. 2017-117717 filed on Jun. 15, 2017, the contents of which are incorporated herein by reference.

BACKGROUND OF THE INVENTION

Field of the Invention

The present invention relates to a fuel cell stack including a stack body formed by stacking a plurality of unit cells together, a load receiver including a protrusion protruding outward from an outer peripheral portion of a separator of each of the unit cells and provided in the separator, and a contact portion provided in an outer peripheral portion of the separator, and spaced from the unit cells.

Description of the Related Art

For example, a solid polymer electrolyte fuel cell includes a unit cell (power generation cell). The unit cell is formed by sandwiching a membrane electrode assembly (MEA) between separators. The membrane electrode assembly includes an electrolyte membrane, and an anode and a cathode on both sides of the electrolyte membrane. The electrolyte membrane is a polymer ion exchange membrane. In use, normally, a predetermined number of the unit cells are stacked, and tightened together to form, e.g., an in-vehicle fuel cell stack.

In this type of the fuel cell stack, an impact load may be applied to the fuel cell stack from the outside. In such a situation, the unit cells move easily in a direction (in which no tightening load is applied) perpendicular to a direction in which the unit cells are stacked together (hereinafter also referred to as the stacking direction).

For example, in Japanese Laid-Open Patent Publication No. 2016-143545, a fuel cell stack which can suppress such movement is proposed. In this fuel cell stack, a load receiver in the form of a plate is provided in a separator. The load receiver protrudes outward from an outer peripheral portion of the separator. The load receiver is brought into contact with a coupling member which couples a pair of end plates in a manner that the load receiver can receive a load in a direction perpendicular to the stacking direction of the unit cells. The load receiver includes a protrusion protruding outward from the outer peripheral portion of the separator. The protrusion has a rectangular shape.

SUMMARY OF THE INVENTION

In this regard, in the above fuel cell stack, a lateral side (flat surface) of the rectangular protrusion contacts a contact portion of the coupling member to receive the external load. Therefore, the contact portion may contact the protrusion at different contact positions depending on the dimensional tolerance and/or assembling tolerance of the fuel cell stack. Under the circumstances, since the distance between the portion of the load receiver provided in the separator (fulcrum point) and the portion of the load receiver which contacts the contact portion (force point) changes, it may not be possible to receive the external load in the direction perpendicular to the stacking direction of the unit cells stably.

The present invention has been made taking such a problem into account, and an object of the present invention is to provide a fuel cell stack which makes it possible to stably receive an external load in a direction perpendicular to a direction in which unit cells are stacked together.

In order to achieve the above object, a fuel cell stack according to the present invention includes a stack body including a plurality of unit cells stacked together in a stacking direction, a load receiver provided in a separator of each of the unit cells and including a protrusion protruding outward from an outer peripheral portion of the separator, and a contact portion facing the load receiver and being configured to support the load receiver. The load receiver is configured to contact the contact portion to receive a load in a width direction of the protrusion which is perpendicular to the stacking direction of the unit cells and a protruding direction of the protrusion. The protrusion includes a protrusion body positioned at a center in the width direction of the protrusion, and a pair of expansions expanded in the width direction from both ends of the protrusion body in the width direction, and when the load receiver contacts the contact portion, only a top portion of the expansion contacts the contact portion.

The above fuel cell stack may include a joint portion configured to join the load receiver and the outer peripheral portion of the separator together.

In the above fuel cell stack, the separator may partially protrude in the stacking direction to form a rib in the separator, and the rib may be positioned adjacent to the joint portion and extend in the width direction.

In the above fuel cell stack, a distance between a fulcrum point of the load receiver provided in the separator and the top portion of one of the expansions in the protruding direction may be same as a distance between the fulcrum point and a top portion of another of the expansions in the protruding direction.

In the above fuel cell stack, the top portion of each of the expansions may have a circular arc shape.

In the above fuel cell stack, the separator may have a rectangular shape, and the load receiver may be provided in each of opposite sides of the separator.

The fuel cell stack may further include a pair of end plates provided at both ends in the stacking direction, and the contact portion may be provided in a coupling member coupling the pair of end plates together.

The above fuel cell stack may further include a cover configured to cover the plurality of unit cells, and the contact portion may be provided in an inner surface of the cover.

In the above fuel cell stack, the contact portion may include a recess, and the protrusion is partially inserted into the recess, and a root of the protrusion may be exposed to outside of the recess.

In the above fuel cell stack, the top portion may be positioned on a side closer to the separator from a center of the protrusion body in the protruding direction of the protrusion.

In the present invention, when the load receiver contacts the contact portion, only the top portion of the expansion of the protrusion contacts the contact portion. Therefore, even in the case where the fuel cell stack has dimensional tolerance and/or production tolerance of component parts, the distances between the portion (a fulcrum point) of the load receiver provided in the separator and the portions (force points or points of effort) which contact the contact portion can be kept constant. Therefore, it is possible to suppress variation of the load applied to the fulcrum point of the load receiver due to the dimensional tolerance and the production tolerance. Thus, it is possible to stably receive the external load in the direction perpendicular to the direction in which the unit cells are stacked together.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, preferred embodiments of a fuel cell stack according to the present invention will be described with reference to the accompanying drawings.

Figure 1:
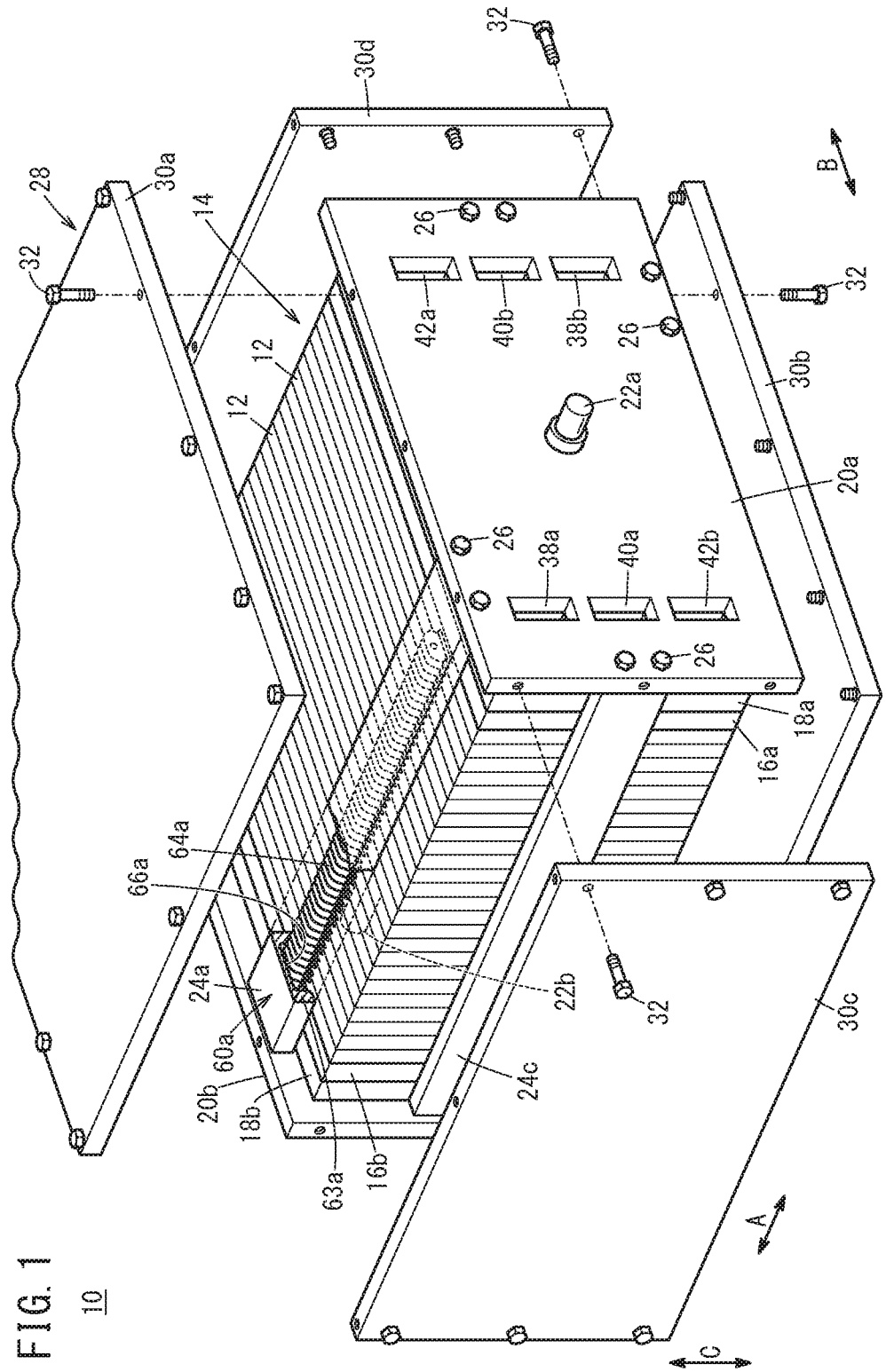
FIG. 1 is a partial perspective view showing a fuel cell stack according to one embodiment of the present invention.

As shown in FIG. 1, a fuel cell stack 10 according to an embodiment of the present invention includes a stack body 14 formed by stacking a plurality of unit cells 12 together in a stacking direction. For example, the fuel cell stack 10 is mounted in a fuel cell automobile in a manner that the stacking direction (indicated by an arrow A) of the plurality of unit cells 12 is oriented in a horizontal direction (vehicle width direction or vehicle length direction) of the fuel cell automobile. It should be noted that the fuel cell stack 10 may be mounted in a fuel cell automobile in a manner that the stacking direction of the plurality of unit cells 12 is oriented in a vertical direction (vehicle height direction) of the fuel cell automobile.

At one end of the stack body 14 in the stacking direction indicated by the arrow A, a terminal plate 16a is provided. An insulating plate 18a is provided outside the terminal plate 16a, and an end plate 20a is provided outside the insulating plate 18a. At another end of the stack body 14 in the stacking direction, a terminal plate 16b is provided. An insulating plate 18b is provided outside terminal plate 16b, and an end plate 20b is provided outside the insulating plate 18b. That is, the pair of end plates 20a, 20b are provided at both ends of the plurality of unit cells 12 in the stacking direction. An output terminal 22a extends from the central portion of the end plate 20a, and is connected to the terminal plate 16a. An output terminal 22b extends from the central portion of the end plate 20b, and is connected to the terminal plate 16b.

Figure 2:
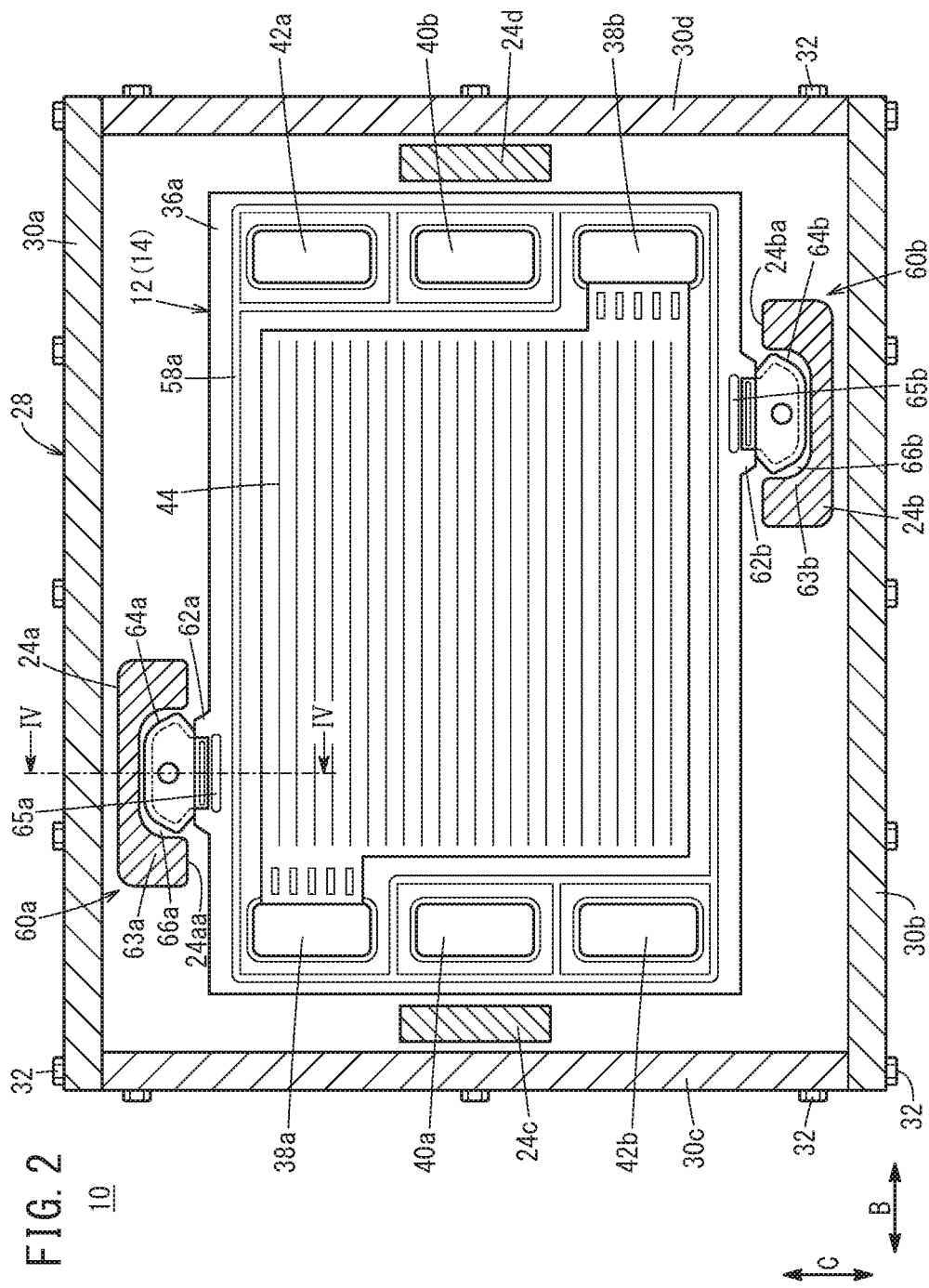
FIG. 2 is a lateral cross sectional view schematically showing the fuel cell stack in FIG. 1.

Each of the end plates 20a, 20b has a laterally elongated rectangular shape. As shown in FIGS. 1 and 2, coupling members 24a to 24d (coupling bars) are provided at intermediate positions of respective sides of the end plates 20a, 20b. Both ends of each of the coupling members 24a to 24d are fixed to inner surfaces of the end plates 20a, 20b using bolts 26 (see FIG. 1). In the structure, the coupling members 24a to 24d apply a tightening load in the stacking direction indicated by the arrow A to the stack body 14. The coupling member 24a is shifted from the center of one of the long sides of the end plates 20a, 20b toward one end side. The coupling member 24b is shifted from the center of another of the long sides of the end plates 20a, 20b toward another end side. The coupling members 24c, 24d are provided at the center of each of the short sides of the end plates 20a, 20b.

The fuel cell stack 10 includes a cover 28 covering the stack body 14 from a direction perpendicular to the stacking direction. The cover 28 includes a pair of side panels 30a, 30b, and a pair of side panels 30c, 30d. Each of the side panels 30a, 30b has a laterally elongated plate shape, and form two surfaces at both ends of the end plates 20a, 20b in a lateral direction indicated by an arrow C. Each of the side panels 30c, 30d has a laterally elongated plate shape, and form two surfaces at both ends of the end plates 20a, 20b in a longitudinal direction indicated by an arrow B. Each of the side panels 30a to 30d is fixed to side surfaces of the end plates 20a, 20b using bolts 32. The present invention is not limited to the example where the cover 28 is made up of the four side panels 30a to 30d. The cover 28 may be formed integrally by casting. The cover 28 is provided as necessary. The cover 28 may not be provided.

Figure 3:
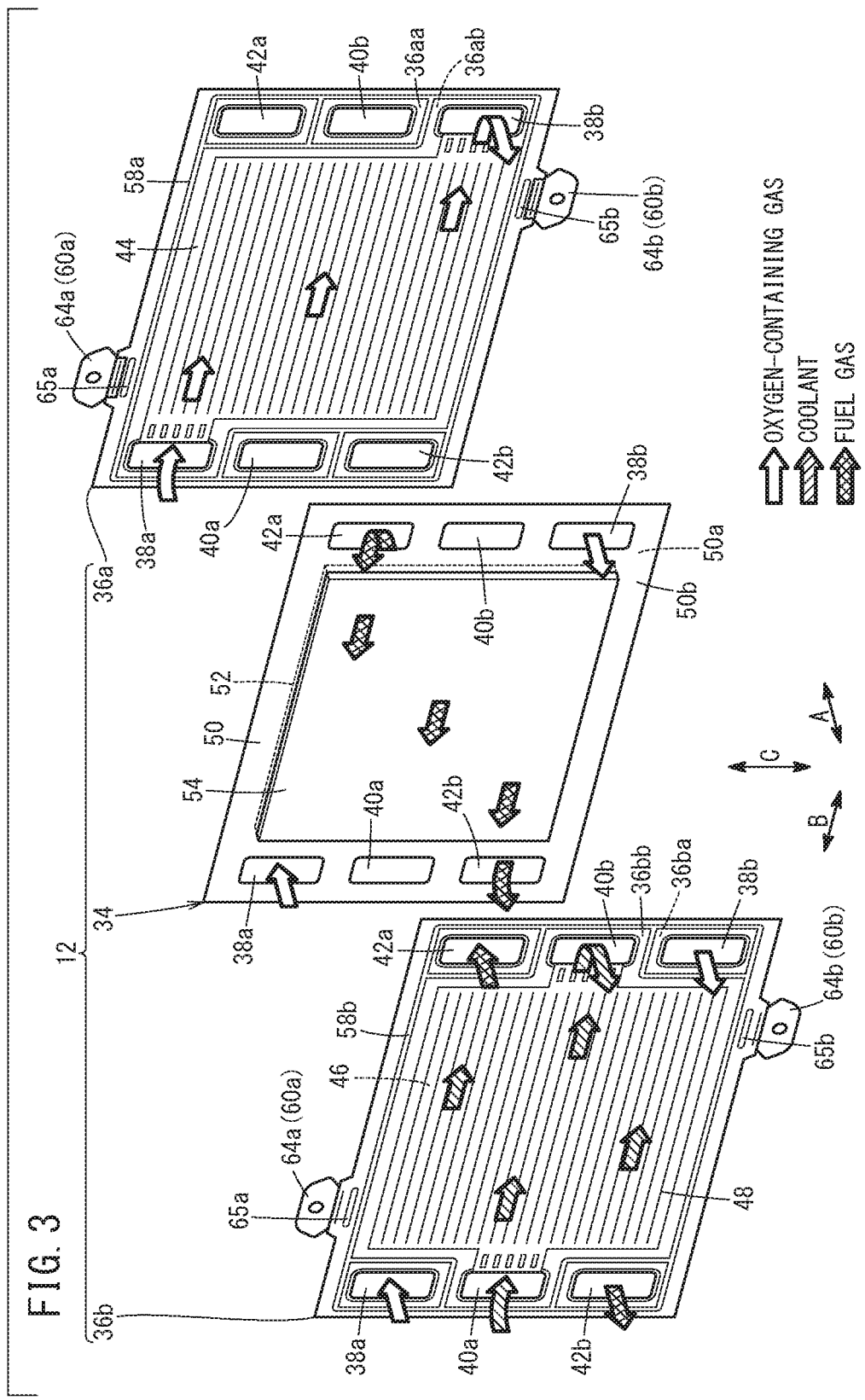
FIG. 3 is an exploded perspective view showing a main part of a unit cell of the fuel cell stack in FIG. 1.
Figure 4:
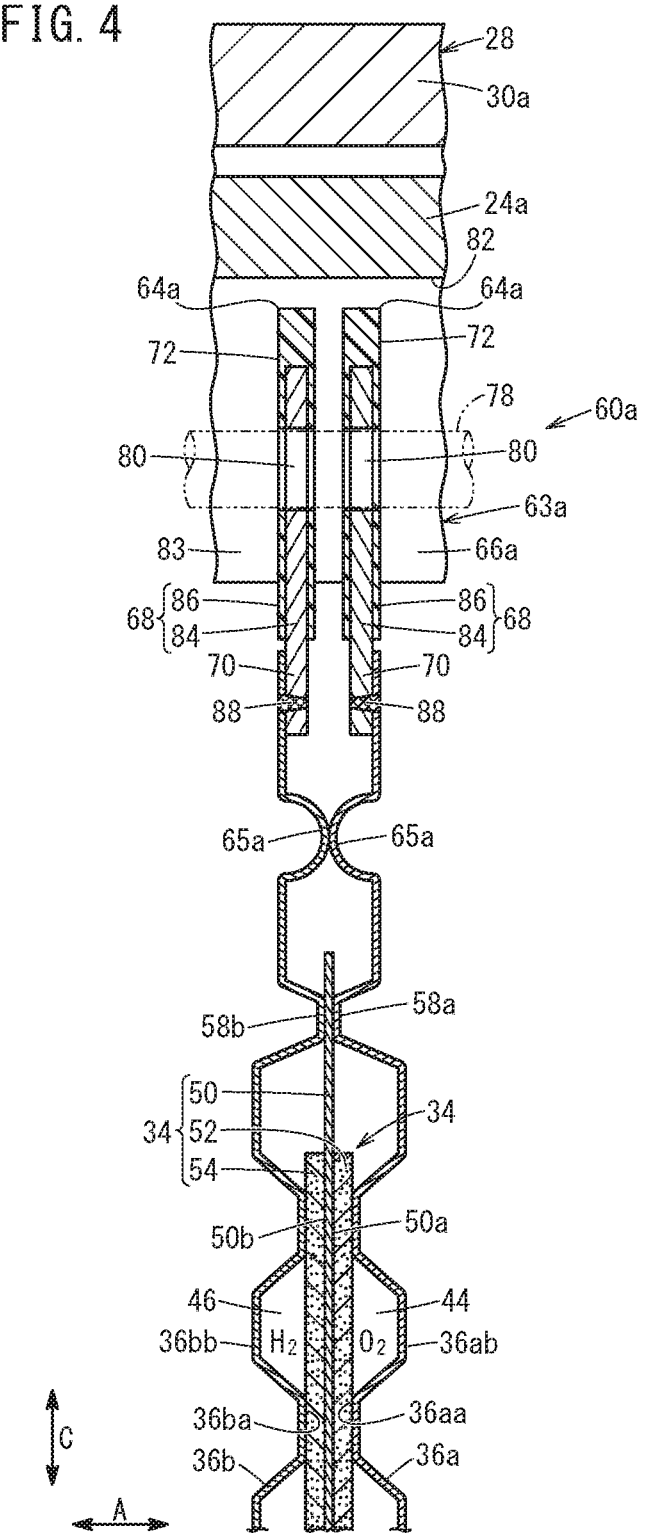
FIG. 4 is a cross sectional view taken along a line IV-IV in FIG. 2.

As shown in FIGS. 3 and 4, the unit cell 12 includes an MEA 34 (membrane electrode assembly) and a first separator 36a and a second separator 36b sandwiching the MEA 34.

In FIG. 3, at one end of the unit cell 12 in a long side direction indicated by an arrow B, an oxygen-containing gas supply passage 38a, a coolant supply passage 40a, and a fuel gas discharge passage 42b are provided. The oxygen-containing gas supply passage 38a, the coolant supply passage 40a, and the fuel gas discharge passage 42b extend through the unit cell 12 in the direction indicated by the arrow A. An oxygen-containing gas is supplied through the oxygen-containing gas supply passage 38a. A coolant is supplied through the coolant supply passage 40a. A fuel gas such as a hydrogen-containing gas is discharged through the fuel gas discharge passage 42b. The oxygen-containing gas supply passage 38a, the coolant supply passage 40a, and the fuel gas discharge passage 42b are arranged in the direction indicated by the arrow C.

At another of the unit cell 12 in the direction indicated by the arrow B, a fuel gas supply passage 42a, a coolant discharge passage 40b, and an oxygen-containing gas discharge passage 38b are provided. The fuel gas supply passage 42a, the coolant discharge passage 40b, and the oxygen-containing gas discharge passage 38b extend through the unit cell 12 in the direction indicated by the arrow A. The fuel gas is supplied through the fuel gas supply passage 42a. The coolant is discharged through the coolant discharge passage 40b. The oxygen-containing gas is discharged through the oxygen-containing gas discharge passage 38b. The fuel gas supply passage 42a, the coolant discharge passage 40b, and the oxygen-containing gas discharge passage 38b are arranged in the direction indicated by the arrow C.

It should be noted that the oxygen-containing gas supply passage 38a, the oxygen-containing gas discharge passage 38b, the fuel gas supply passage 42a, the fuel gas discharge passage 42b, the coolant supply passage 40a, and the coolant discharge passage 40b are also formed in the end plate 20a, respectively (see FIG. 1). The layout of the oxygen-containing gas supply passage 38a, the oxygen-containing gas discharge passage 38b, the fuel gas supply passage 42a, the fuel gas discharge passage 42b, the coolant supply passage 40a, and the coolant discharge passage 40b is not limited to the layout of the embodiment of the present invention. The layout of the oxygen-containing gas supply passage 38a, the oxygen-containing gas discharge passage 38b, the fuel gas supply passage 42a, the fuel gas discharge passage 42b, the coolant supply passage 40a, and the coolant discharge passage 40b may be determined according to the required specification.

As shown in FIGS. 3 and 4, the first separator 36a has an oxygen-containing gas flow field 44 on its surface 36aa facing the MEA 34. The oxygen-containing gas flow field 44 is connected to the oxygen-containing gas supply passage 38a and the oxygen-containing gas discharge passage 38b. The oxygen-containing gas flow field 44 includes a plurality of oxygen-containing gas flow grooves extending in the direction indicated by the arrow B.

The second separator 36b has a fuel gas flow field 46 on its surface 36ba facing the MEA 34. The fuel gas flow field 46 is connected to the fuel gas supply passage 42a and the fuel gas discharge passage 42b. The fuel gas flow field 46 includes a plurality of fuel gas flow grooves extending in the direction indicated by the arrow A.

A coolant flow field 48 is formed on a surface 36ab of the first separator 36a and on a surface 36bb of the second separator 36b facing each other. A plurality of the coolant flow grooves extending in the direction indicated by the arrow B are formed in the coolant flow field 48.

For example, the MEA 34 includes a solid polymer electrolyte membrane 50 (cation ion exchange membrane) as a thin membrane of perfluorosulfonic acid impregnated with water, and a cathode 52 and an anode 54 sandwiching the solid polymer electrolyte membrane 50.

A fluorine based electrolyte may be used as the solid polymer electrolyte membrane 50. Alternatively, an HC (hydrocarbon) based electrolyte may be used as the solid polymer electrolyte membrane 50. The surface size (outer size) of the solid polymer electrolyte membrane 50 is larger than the surface size (outer size) of the cathode 52 and the surface size (outer size) of the anode 54. That is, the solid polymer electrolyte membrane 50 protrudes outward beyond the cathode 52 and the anode 54.

The cathode 52 is joined to a surface 50a of the solid polymer electrolyte membrane 50. The anode 54 is joined to a surface 50b of the solid polymer electrolyte membrane 50. Each of the cathode 52 and the anode 54 includes an electrode catalyst layer and a gas diffusion layer. For example, the electrode catalyst layer includes platinum alloy supported on porous carbon particles, and the carbon particles are deposited uniformly on the surface of the gas diffusion layer. The gas diffusion layer comprises a carbon paper, carbon cloth, etc.

It should be noted that, in the MEA 34, the surface size of the solid polymer electrolyte membrane 50 may be smaller than the surface size of the cathode 52 and the surface size of the anode 54, and a frame shaped resin film (resin frame member) may be sandwiched between an outer marginal portion of the cathode 52 and an outer marginal portion of the anode 54.

Each of the first separator 36a and the second separator 36b has a rectangular (quadrangle) shape. Each of the first separator 36a and the second separator 36b is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. In the state where the surface 36ab of the first separator 36a and the surface 36bb of the second separator 36b face each other, the outer ends of the first separator 36a and the second separator 36b are joined together by welding, brazing, crimping, etc.

A first seal line 58a is formed on the first separator 36a. The first seal line 58a is expanded toward the MEA 34. A protruding end surface of the first seal line 58a is a flat surface which contacts the surface 50a of the solid polymer electrolyte membrane 50 in an air-tight manner (see FIG. 4). It should be noted that the protruding end surface of the first seal line 58a may have a rounded shape. The first seal line 58a is formed around the outer peripheral portion of the first separator 36a, for preventing leakage of fluid (fuel gas, oxygen-containing gas, and coolant) to the outside, through a space between the first separator 36a and the MEA 34. That is, the protruding end surface of the first seal line 58a directly contacts the surface 50a of the solid polymer electrolyte membrane 50 and is deformed elastically for sealing, and thus, the first seal line 58a functions as a metal bead seal. The first seal line 58a may be an elastic rubber seal member.

A second seal line 58b is formed on the second separator 36b. The second seal line 58b is expanded toward the MEA 34. A protruding end surface of the second seal line 58b is a flat surface which contacts the surface 50b of the solid polymer electrolyte membrane 50 in an air-tight manner (see FIG. 4). It should be noted that the protruding end surface of the second seal line 58b may have a rounded shape. The second seal line 58b is formed around the outer peripheral portion of the second separator 36b, for preventing leakage of fluid (fuel gas, oxygen-containing gas, and coolant) to the outside, through a space between the second separator 36b and the MEA 34. That is, the protruding end surface of the second seal line 58b directly contacts the surface 50b of the solid polymer electrolyte membrane 50 and is deformed elastically for sealing, and thus, the second seal line 58b functions as a metal bead seal. The second seal line 58b may be an elastic rubber seal member.

As shown in FIGS. 2 and 3, the first separator 36a has load receiver structure 60a, 60b for receiving an external load (impact load) in a direction (indicated by an arrow B) perpendicular to the stacking direction of the unit cells 12.

Figure 5:
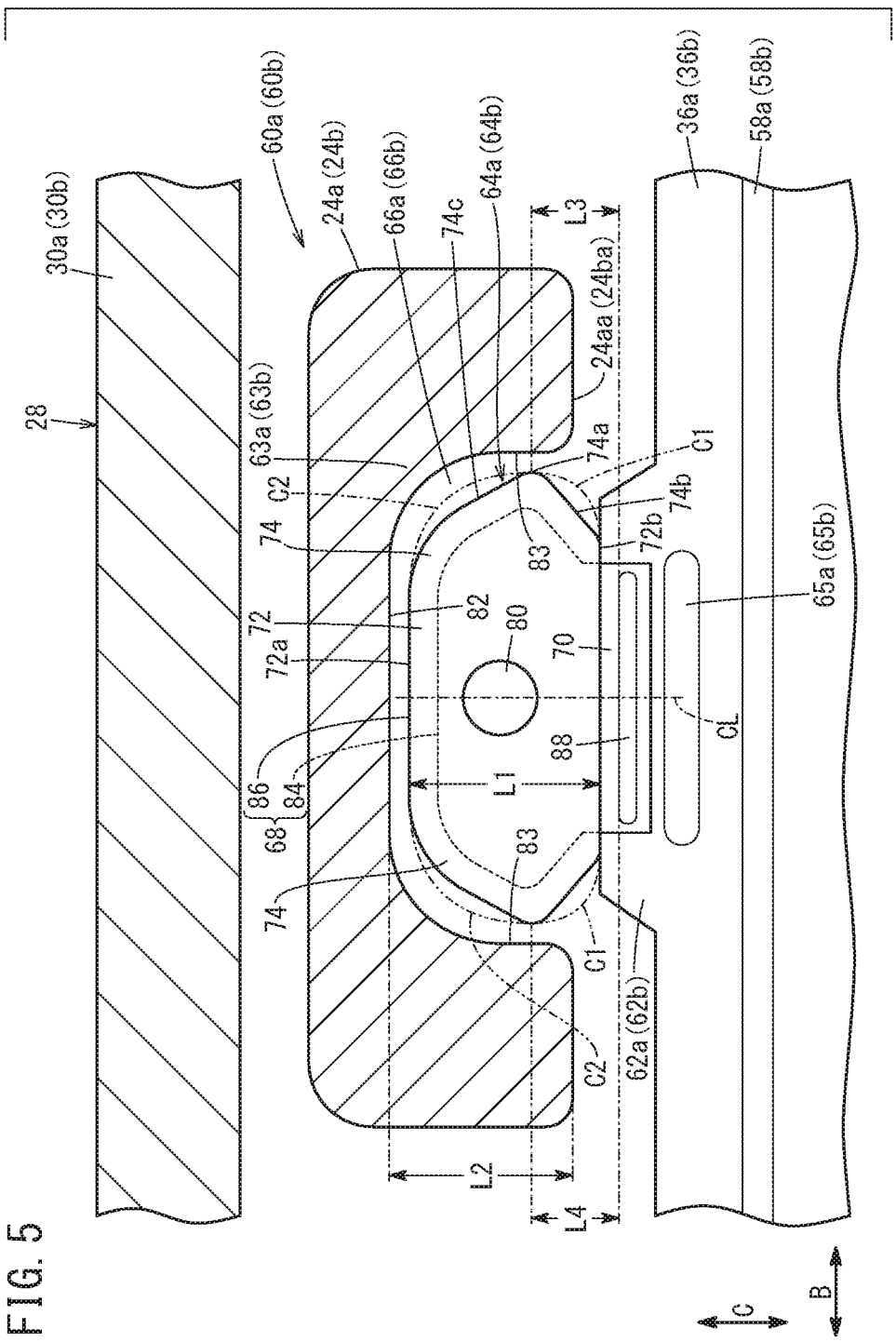
FIG. 5 is an enlarged view showing load receiver structure in FIG. 2.

As shown in FIG. 5, the load receiver structure 60a includes a support portion 62a, a contact portion 63a, a load receiver 64a, and a rib 65a. The support portion 62a is formed integrally with the first separator 36a by press forming. One of long sides of the first separator 36a partially protrudes outward (in the direction indicated by the arrow C) to form the support portion 62a. The support portion 62a is shifted from the center to one end side of the one long side of the first separator 36a, in a manner that the support portion 62a faces the coupling member 24a (see FIGS. 2 and 3).

The contact portion 63a includes a recess 66a formed in a surface 24aa of the coupling member 24a which faces the unit cells 12. The recess 66a extends over the entire length of the coupling member 24a in the stacking direction of the unit cells 12 (see FIG. 1). The recess 66a is a substantially rectangular groove including rounded corners in lateral cross section.

The load receiver 64a is joined to the support portion 62a. The load receiver 64a is symmetrical about the central line CL in the width direction (indicated by the arrow B) of the load receiver 64*a*. The load receiver 64*a* includes a protrusion 68 in the form of a plate protruding outward from the support portion 62*a* in the direction indicated by the arrow C, and an attachment portion 70 provided integrally with the protrusion 68 and fixed to the support portion 62*a*. The protrusion 68 includes a protrusion body 72 and a pair of expansions 74. The protrusion body 72 is positioned at the center of the protrusion 68 in the width direction (indicated by the arrow B), perpendicular to the stacking direction (indicated by the arrow A) of the unit cells 12 and the protruding direction (indicated by the arrow C) of the protrusion 68. The pair of expansions 74 are expanded from both ends of the protrusion body 72 in the width direction to both sides in the width direction. It is sufficient that the width direction of the load receiver 64*a* and the width direction of the protrusion 68 is substantially perpendicular to the stacking direction (indicated by the arrow A) of the unit cells 12 and the protruding direction (indicated by the arrow C) of the protrusion 68.

A positioning hole 80 is formed at the center of the protrusion body 72, for inserting a rod 78 into the positioning hole 80 to position each of the unit cells 12 at the time of producing the fuel cell stack 10 (see FIG. 4). After completion of positioning of each of the unit cells 12, the rod 78 may be detached from the positioning hole 80 or the rod 78 may be left inside the positioning hole 80.

A protruding end 72*a* of the protrusion body 72 in the direction indicated by the arrow C faces a bottom surface 82 of the recess 66*a* through a gap. Each of the expansions 74 has a substantially triangular shape. Specifically, each of the expansions 74 includes a top portion 74*a* positioned most remotely from the protrusion body 72 in the direction indicated by the arrow B, a first inclined portion 74*b* inclined straight from a root 72*b* of the protrusion body 72 to the top portion 74*a*, in a direction away from the support portion 62*a*, and a second inclined portion 74*c* inclined straight from the protruding end 72*a* to the top portion 74*a* of the protrusion body 72, in a direction toward the support portion 62*a*.

In the state where no external load is applied to the fuel cell stack 10, the top portion 74*a* of the expansion 74 faces a flat side surface 83 of the recess 66*a* through a gap. In the expansion 74, the distance between the top portion 74*a* and the side surface 83 is shorter than the distance between portions other than the top portion 74*a* (the first inclined portion 74*b* and the second inclined portion 74*c*) and the side surface 83. The outer shape (first inclined portion 74*b*) of the expansion 74 between the end of the root 72*b* in the direction indicated by the arrow B and the top portion 74*a* is positioned inside a protruding circular arc C1 connecting the end of the root 72*b* in the direction indicated by the arrow B and the top portion 74*a*. Further, the outer shape (second inclined portion 74*c*) of the expansion 74 between the end of the protruding end 72*a* in the direction indicated by the arrow B and the top portion 74*a* is positioned inside a protruding circular arc C2 connecting the end of the protruding end 72*a* in the direction indicated by the arrow B and the top portion 74*a*.

The top portion 74*a* has a circular arc shape. The top portion 74*a* is positioned on a side closer to the support portion 62*a* from the center of the positioning hole 80. The positioning hole 80 is provided at the center of the protrusion body 72. That is, the top portion 74*a* is positioned on a side closer to the support portion 62*a* from the center of the protrusion body 72 in the direction indicated by the arrow C. The protruding length L1 of the protrusion 68 in the direction indicated by the arrow C (distance from the support portion 62*a* to the protruding end 72*a* of the protrusion 68) is larger than the depth L2 of the recess 66*a* in the direction indicated by the arrow C. Therefore, the root 72*b* of the protrusion 68 is exposed to the outside of the recess 66*a* (the root 72*b* is not inserted into the recess 66*a*). In the structure, the support portion 62*a* is not brought into contact with the contact portion 63*a* in the direction indicated by the arrow C significantly. In the state where no external load is applied to the unit cells 12, the top portion 74*a* is spaced from the side surface 83 of the recess 66*a*.

The protrusion 68 includes a base portion 84 forming the outer shape of the protrusion 68, and an insulating part 86 covering the outer surface of the base portion 84. The base portion 84 and the attachment portion 70 are formed integrally by press forming of a single metal plate. Examples of the material of the base portion 84 and the attachment portion 70 include those of the first separator 36*a* and the second separator 36*b*. The insulating part 86 interrupts electrical connection between the base portion 84 and the coupling member 24*a*.

The attachment portion 70 has a rectangular shape, and extends in the direction indicated by the arrow B. The attachment portion 70 is positioned at the center of the support portion 62*a* in the direction indicated by the arrow B. The attachment portion 70 is stacked on a surface of the support portion 62*a*. In this state, the attachment portion 70 is joined to the support portion 62*a* by welding or brazing. A joint portion 88 (welding bead) joins the attachment portion 70 and the support portion 62*a* together. The joint portion 88 extends in a longitudinal direction of the attachment portion 70 (in the direction indicated by the arrow B).

The distance L3 between the joint portion 88 as a pivotal point provided in the first separator 36*a* in the load receiver 64*a* and the top portion 74*a* of one of the expansions 74 in the protruding direction (indicated by the arrow C) is the same as the distance L4 between the joint portion 88 and the top portion 74*a* of the other expansion 74 in the protruding direction.

The rib 65*a* is provided integrally with the first separator 36*a* by press forming. The first separator 36*a* partially protrudes in the stacking direction to form the rib 65*a*. The rib 65*a* extends in the width direction (indicated by the arrow B) of the load receiver 64*a* of the protrusion 68.

The rib 65*a* is positioned adjacent to the joint portion 88. As shown in FIG. 4, the rib 65*a* protrudes in a circular arc shape toward the surface 36*aa* of the first separator 36*a* which contacts the MEA 34. It should be noted that the protruding end of the rib 65*a* may have a flat surface. The protruding end of the rib 65*a* contacts the protruding end of the rib 65*a* of the load receiver structure 60*a* provided in the second separator 36*b*.

As shown in FIGS. 2 and 3, the load receiver structure 60*b* includes a support portion 62*b*, a contact portion 63*b*, a load receiver 64*b*, and a rib 65*b*. The support portion 62*b* is provided integrally with the first separator 36*a* by press forming. The other long side of the first separator 36*a* partially protrudes outward (in the direction indicated by the arrow C) to form the support portion 62*b*. The support portion 62*b* is shifted from the center of the other long side of the first separator 36*a* to the other end side in a manner that the support portion 62*b* faces the coupling member 24*b*.

The contact portion 63*b* includes a recess 66*b* formed in a surface 24*ba* of the coupling member 24*b* facing the unit cells 12. The recess 66*b* extends over the entire length of the coupling member 24*b* in the stacking direction of the unit cells 12. The recess 66*b* is a groove having a substantially rectangular shape in lateral cross section, and has the same structure as that of the recess 66a described above.

The load receiver 64b is provided for the support portion 62b. The load receiver 64b has the same structure as the load receiver 64a described above (structure obtained by inverting the load receiver 64a upside down). Therefore, the detailed description of the load receiver 64b is omitted.

In the embodiment of the present invention, the load receiver 64a and the load receiver 64b are positioned point-to-point symmetrical with each other about the center of the surface of the first separator 36a. However, it should be noted that the load receiver 64a and the load receiver 64b may not be positioned point-to-point symmetrical with each other.

The rib 65b is provided integrally with the first separator 36a by press forming. In the rib 65b, the first separator 36a partially protrudes in the stacking direction, and extends in the width direction (indicated by the arrow B) of the protrusion 68 of the load receiver 64b.

The rib 65b is provided adjacent to the joint portion 88 of the load receiver 64b. The rib 65b protrudes in a circular arc shape toward the surface 36aa of the first separator 36a which contacts the MEA 34. It should be noted that the protruding end of the rib 65b may have a flat surface. The protruding end of the rib 65b contacts the protruding end of the rib 65b of the load receiver structure 60b provided for the second separator 36b.

As in the case of the first separator 36a, the second separator 36b has the load receiver structure 60a, 60b for receiving an external load (impact load) applied to the unit cells 12 in the direction indicated by the arrow B. The load receiver structure 60a, 60b of the second separator 36b has the same structure as the load receiver structure 60a, 60b of the first separator 36a, and thus, the detailed description thereof is omitted (see the description of the load receiver structure 60a, 60b of the first separator 36a described above).

Next, operation of the fuel cell stack 10 having the above structure will be described.

Firstly, as shown in FIG. 1, the oxygen-containing gas such as the air is supplied to the oxygen-containing gas supply passage 38a of the end plate 20a. The fuel gas such as the hydrogen-containing gas is supplied to the fuel gas supply passage 42a of the end plate 20a. In the meanwhile, coolant such as pure water, ethylene glycol or oil is supplied from the coolant supply passage 40a of the end plate 20a.

As shown in FIG. 3, the oxygen-containing gas flows from the oxygen-containing gas supply passage 38a into the oxygen-containing gas flow field 44 of the first separator 36a. The oxygen-containing gas flows along the oxygen-containing gas flow field 44 in the direction indicated by the arrow B, and the oxygen-containing gas is supplied to the cathode 52 of the membrane electrode assembly.

The fuel gas flows from the fuel gas supply passage 42a to the fuel gas flow field 46 of the second separator 36b. The fuel gas flows along the fuel gas flow field 46 in the direction indicated by the arrow B, and the fuel gas is supplied to the anode 54 of the membrane electrode assembly.

Thus, in each of the MEAs 34, the oxygen-containing gas supplied to the cathode 52 and the fuel gas supplied to the anode 54 are partially consumed in the electrochemical reactions to perform power generation.

Then, the oxygen-containing gas supplied to the cathode 52 and partially consumed therein is discharged along the oxygen-containing gas discharge passage 38b in the direction indicated by the arrow A. Likewise, the fuel gas supplied to the anode 54 is discharged along the fuel gas discharge passage 42b in the direction indicated by the arrow A.

Further, after the coolant supplied to the coolant supply passage 40a flows into the coolant flow field 48 formed between the first separator 36a and the second separator 36b, the coolant flows in the direction indicated by the arrow B. After the coolant cools the MEA 34, the coolant is discharged from the coolant discharge passage 40b.

In the embodiment of the present invention, the following advantages are obtained. Hereinafter, though the description will be given mainly in connection with the first separator 36a, also in the second separator 36b, the same advantages are obtained.

The fuel cell stack 10 includes the stack body 14 formed by stacking the plurality of unit cells 12 together, the load receivers 64a, 64b provided in the first separator 36a of each of the unit cells 12 and each including the protrusion 68 protruding outward from the outer peripheral portion of the first separator 36a, and the contact portions 63a, 63b which face the load receivers 64a, 64b and are configured to support the load receivers 64a, 64b.

Figure 6:
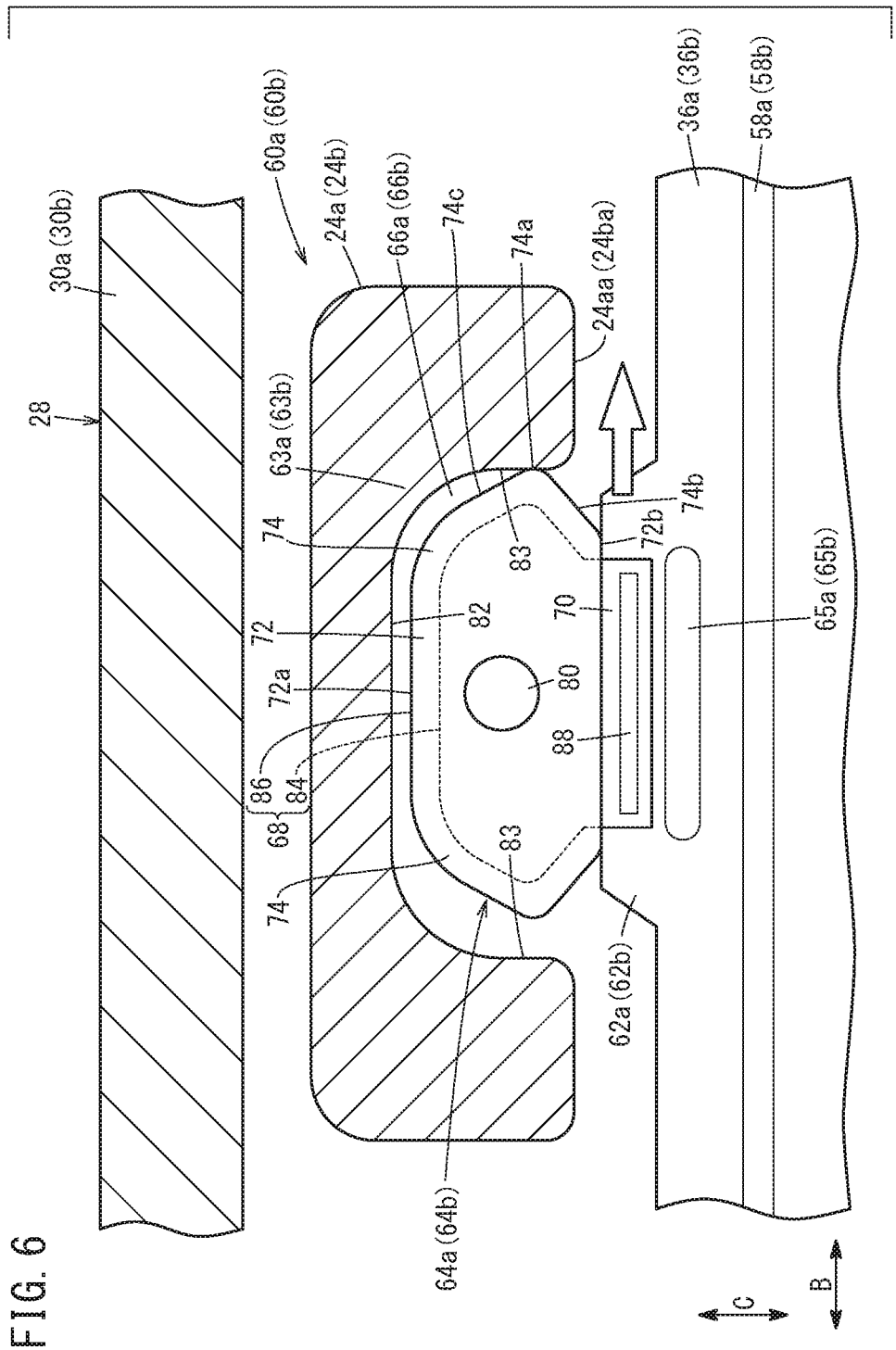
FIG. 6 is an enlarged view illustrating operation of the load receiver structure in FIG. 5.

Further, as shown in FIG. 6, when an inertial force is applied to the stack body 14, the top portion 74a of the protrusion 68 contacts the contact portion 63a (side surface 83 of the recess 66a). Thus, the fuel cell stack 10 can receive the load in the direction (direction indicated by the arrow B) perpendicular to the stacking direction of the unit cells 12.

The protrusion 68 includes the protrusion body 72 positioned at the center in the width direction of the protrusion 68, and the pair of expansions 74 expanded in the width direction from both ends of the protrusion body 72 in the width direction. When the load receiver 64a (64b) contacts the contact portion 63a (63b), only the top portion 74a of the expansion 74 contacts the contact portion 63a (63b) (side surface 83). That is, the portions of the expansion 74 other than the top portion 74a do not contact the contact portion 63a (63b).

Therefore, even in the case where the fuel cell stack 10 has dimensional tolerance and/or production tolerance of component parts, the distances L3, L4 between the portion (fulcrum point) of the load receiver 64a (64b) provided in the first separator 36a (the second separator 36b), and the portions (force points) which contact the side surfaces 83 of the recess 66a (66b) can be kept constant. Thus, it is possible to suppress variation of the load applied to the fulcrum point of the load receiver 64a (64b) due to the dimensional tolerance and/or the production tolerance. Accordingly, it is possible to stably receive the external load in the direction perpendicular to the stacking direction of the unit cells 12.

The fuel cell stack 10 includes the joint portion 88 for joining the load receiver 64a and the outer peripheral portion (support portion 62a) of the first separator 36a together. Therefore, after the first separator 36a and the load receivers 64a, 64b are produced separately, these members can be joined together. Accordingly, it is possible to simplify the structure of the first separator 36a, and produce the first separator 36a easily.

The first separator 36a partially protrudes in the stacking direction to form the ribs 65a, 65b in the first separator 36a. The ribs 65a, 65b are positioned adjacent to the joint portion 88, and extend in the width direction. Therefore, since it is possible to improve the rigidity of the first separator 36a in the portion adjacent to the joint portion 88, by the ribs 65a, 65b, the load receivers 64a, 64b do not significantly tilt in the stacking direction (indicated by the arrow A) with respect to the first separator 36a.

The distance L3 between the fulcrum point (joint portion 88) of the load receiver 64a (64b) in the first separator 36a and the top portion 74a of one of the expansions 74 in the protruding direction is the same as the distance L4 between the fulcrum point (joint portion 88) and the top portion 74a of the other expansion 74 in the protruding direction. Therefore, the distance between the force point and the fulcrum point of each expansion 74 can be kept constant.

The top portion 74a of each expansion 74 has a circular arc shape. In the structure, the top portion 74a is not damaged significantly when the top portion 74a contacts the contact portions 63a, 63b.

The first separator 36a has a rectangular shape. The load receivers 64a, 64b are provided in each of opposite sides of the first separator 36a. Stated otherwise, the load receivers 64a, 64b are provided adjacent to diagonal positions of the opposite sides of the first separator 36a. In the structure, it is possible to receive the load of the unit cells 12 with good balance.

The fuel cell stack 10 includes the pair of end plates 20a, 20b provided at both ends in the stacking direction. The contact portions 63a, 63b are provided at the coupling members 24a, 24b coupling the pair of end plates 20a, 20b together. In the structure, it is possible to receive the external load applied to the unit cells 12 by the coupling members 24a, 24b.

The contact portions 63a, 63b include the recesses 66a, 66b, and the protrusions 68 are partially inserted into the recesses 66a, 66b. The roots 72b of the protrusions 68 are exposed to the outside of the recesses 66a, 66b. Thus, it becomes possible to suppress contact of the separator 36a (support portion 62a) with the contact portions 63a, 63b.

Figure 7:
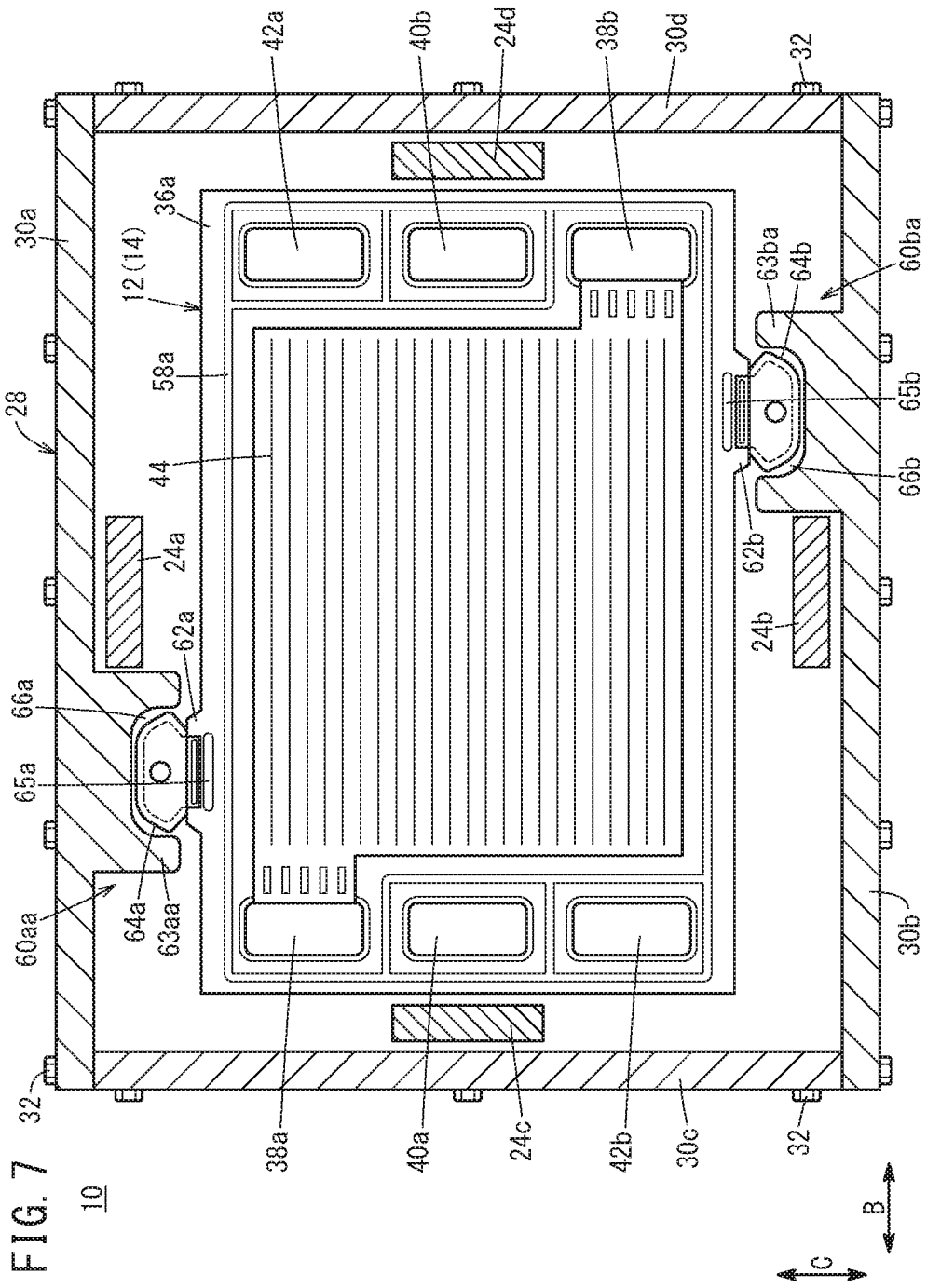
FIG. 7 is a cross sectional view schematically showing a fuel cell stack including load receiver structure according to a modified embodiment.

The present invention is not limited to the structure of the above described fuel cell stack 10. For example, the fuel cell stack 10 may have load receiver structure 60aa, 60ba shown in FIG. 7. As shown in FIG. 7, the load receiver structure 60aa includes a support portion 62a, a contact portion 63aa, a load receiver 64a, and a rib 65a. The contact portion 63aa is formed integrally with the inner surface of the side panel 30a of the cover 28. The contact portion 63aa has a recess 66a.

Further, the load receiver structure 60ba includes a support portion 62b, a contact portion 63ba, a load receiver 64b, and a rib 65b. The contact portion 63ba is formed integrally with the inner surface of the side panel 30b of the cover 28. The contact portion 63ba has a recess 66b. In this case, the coupling members 24a, 24b, 24c, 24d are provided in a manner that the coupling members 24a, 24b, 24c, 24d couple the central portions of the sides of the end plates 20a, 20b.

In the structure, since the contact portions 63aa, 63ba are provided in the inner surface of the cover 28, it is possible to receive the external load applied to the unit cells 12 by the cover 28.

In the present invention, the load receivers 64a, 64b may be formed integrally with the outer peripheral portions (support portions 62a, 62b) of the first separator 36a and the second separator 36b, e.g., by press forming. In this case, it is possible to reduce the number of component parts of the fuel cell stack 10.

The load receivers 64a, 64b may be provided at central positions of the long sides of the first separator 36a and the second separator 36b. Further, two or more load receivers 64a, 64b may be provided in each of the long sides of the first separator 36a and the second separator 36b. Further, the load receivers 64a, 64b may be provided for only one of the first separator 36a and the second separator 36b.

The fuel cell stack according to the present invention is not limited to the above described embodiments. It is a matter of course that various structures may be adopted without departing from the gist of the present invention.

What is claimed is:

1. A fuel cell stack comprising:
   a stack body including a plurality of unit cells stacked together in a stacking direction;
   a load receiver provided in a separator of each of the plurality of unit cells and including a protrusion protruding outward from an outer peripheral portion of the separator;
   a joint portion configured to join the load receiver and the outer peripheral portion of the separator together; and
   a contact portion facing the load receiver and being configured to support the load receiver,
   wherein the load receiver is configured to contact the contact portion to receive a load in a width direction of the protrusion which is perpendicular to the stacking direction of the plurality of unit cells and a protruding direction of the protrusion,
   wherein the separator partially protrudes in the stacking direction to form a rib in the separator, and the rib is positioned adjacent to the joint portion and extends in the width direction,
   the protrusion includes:
   a protrusion body positioned at a center in the width direction of the protrusion; and
   a pair of expansions expanded in the width direction from both ends of the protrusion body in the width direction,
   wherein the contact portion includes a pair of flat surfaces respectively facing distal ends of the pair of expansions in the width direction,
   wherein, when the load receiver contacts the contact portion, only one of the distal ends of the pair of expansions contacts the contact portion, and
   each of the distal ends of the pair of expansions has an arc shape.

2. The fuel cell stack according to claim 1, wherein a distance between a fulcrum point of the load receiver provided in the separator and a distal end of one of the pair of expansions in the protruding direction is same as a distance between the fulcrum point and a distal end of another of the pair of expansions in the protruding direction.

3. The fuel cell stack according to claim 1, wherein the separator has a rectangular shape, and
the load receiver is provided in each of opposite sides of the separator.

4. The fuel cell stack according to claim 1, further comprising a pair of end plates provided at both ends in the stacking direction,
the contact portion being provided in a coupling member coupling the pair of end plates together.

5. The fuel cell stack according to claim 1, further comprising a cover configured to cover the plurality of unit cells,
the contact portion being provided in an inner surface of the cover.

6. A fuel cell stack comprising:
   a stack body including a plurality of unit cells stacked together in a stacking direction;
   a load receiver provided in a separator of each of the plurality of unit cells and including a protrusion protruding outward from an outer peripheral portion of the separator; and
   a contact portion facing the load receiver and being configured to support the load receiver, wherein the load receiver is configured to contact the contact portion to receive a load in a width direction of the protrusion which is perpendicular to the stacking direction of the plurality of unit cells and a protruding direction of the protrusion, wherein the contact portion includes a recess, and the protrusion is partially inserted into the recess, and a root of the protrusion is exposed to outside of the recess, the protrusion includes:

a protrusion body positioned at a center in the width direction of the protrusion; and a pair of expansions expanded in the width direction from both ends of the protrusion body in the width direction, wherein the contact portion includes a pair of flat surfaces respectively facing distal ends of the pair of expansions in the width direction, wherein, when the load receiver contacts the contact portion, only one of the distal ends of the pair of expansions contacts the contact portion, and each of the distal ends of the pair of expansions has an arc shape.

7. A fuel cell stack comprising:

a stack body including a plurality of unit cells stacked together in a stacking direction;

a load receiver provided in a separator of each of the plurality of unit cells and including a protrusion protruding outward from an outer peripheral portion of the separator; and a contact portion facing the load receiver and being configured to support the load receiver, wherein the load receiver is configured to contact the contact portion to receive a load in a width direction of the protrusion which is perpendicular to the stacking direction of the plurality of unit cells and a protruding direction of the protrusion, the protrusion includes:

a protrusion body positioned at a center in the width direction of the protrusion; and a pair of expansions expanded in the width direction from both ends of the protrusion body in the width direction, wherein the contact portion includes a pair of flat surfaces respectively facing distal ends of the pair of expansions in the width direction, wherein, when the load receiver contacts the contact portion, only one of the distal ends of the pair of expansions contacts the contact portion, each of the distal ends of the pair of expansions has an arc shape, and wherein the distal ends are positioned on a side closer to the separator from a center of the protrusion body in the protruding direction of the protrusion.

* * * * *